Sept. 18, 1956         E. C. HELFELD         2,763,119
             HAY PICK-UP AND CONVEYING MACHINE
Filed Jan. 15, 1953                        3 Sheets-Sheet 1

Inventor.
Elmer C. Helfeld.
By John A. Watson
           Attorney.

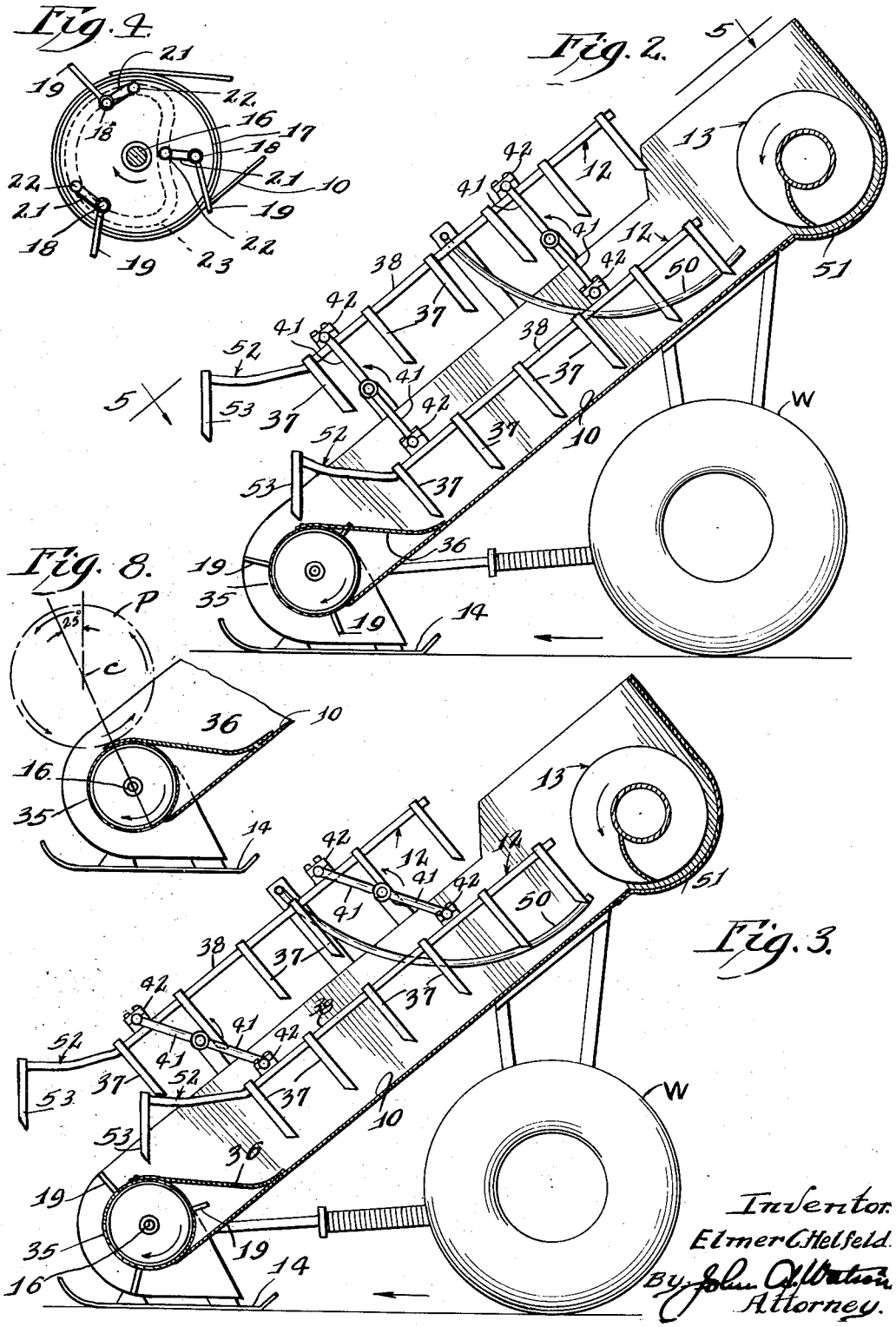

Sept. 18, 1956 — E. C. HELFELD — 2,763,119
HAY PICK-UP AND CONVEYING MACHINE
Filed Jan. 15, 1953 — 3 Sheets-Sheet 3
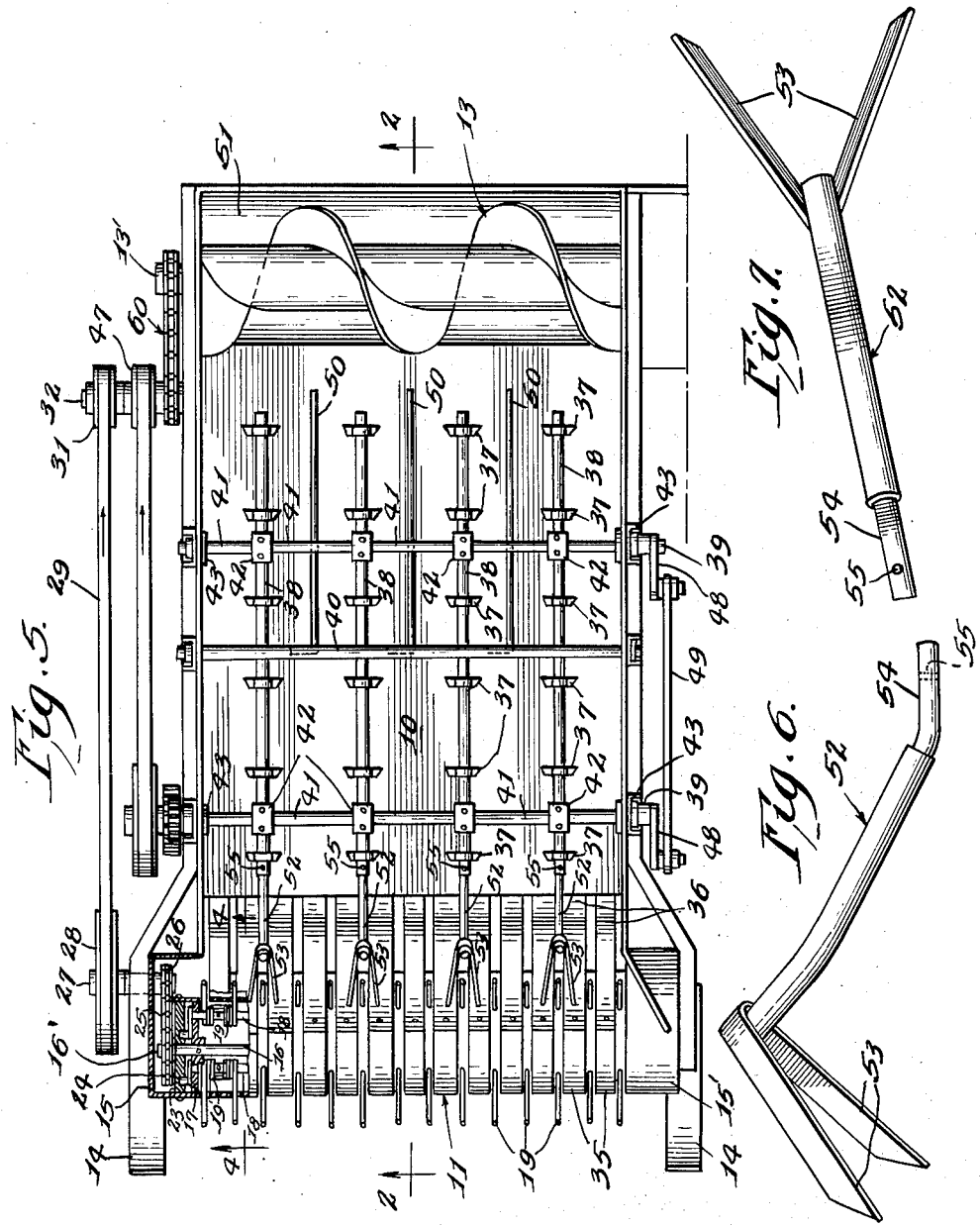
Inventor.
Elmer C. Helfeld
By John A. Watson
Attorney.

United States Patent Office 2,763,119
Patented Sept. 18, 1956

2,763,119

HAY PICK-UP AND CONVEYING MACHINE

Elmer C. Helfeld, Valley City, N. Dak.

Application January 15, 1953, Serial No. 331,357

4 Claims. (Cl. 56—344)

The invention pertains to machines for gathering and conveying or feeding to a desired place such agricultural crop materials as cut grasses, fodder, grains, vines and the like, whether in the green or dry state, which, for convenience of reference and definition herein will be considered as embraced within the meaning of the word "hay."

More particularly, the invention relates to a rake or rake-type feed mechanism of which one example is shown in Rusco Patent 2,266,815 of December 23, 1941 and while it may be applicable to or useful in conjunction with various other hay gathering and loading or feeding machines it is especially useful when utilized with pick-up mechanisms of a type exemplified in Ronning et al. Patent 2,455,906 of December 7, 1948. Since excellent results have been obtained by employing the invention in a baler of the type shown in Ronning et al. Patent 2,548,559 of April 10, 1951, commercial forms of such balers having a pick-up mechanism of the type mentioned above, the invention will be disclosed in its application to such type of a baler so equipped.

As baling machines of such type move forward in the field, the forwardly and upwardly moving fingers of the pick-up mechanism, as those fingers move around in their more or less circular paths, engage and lift the hay from the ground and deposit it upon the upper surface of an upwardly and rearwardly inclined deck or floor over which the hay is raked upwardly to an auger feed mechanism which feeds the hay, transversely of its path up the deck, into the baling chamber of the baling mechanism proper. The hay is moved up the deck or floor by a plurality of rakes which are mounted, at spaced intervals, transversely and longitudinally over the upper surface of the deck. Maximum efficiency and effectiveness of operation of each of these several mechanisms is very largely dependent upon a relatively even and relatively continuous flow of hay onto and up the deck and into and through the auger feed to the baling chamber. Jamming and work stoppages and breakdowns of the baler frequently occur when the hay is gathered and fed in bunched masses or otherwise irregularly and unevenly in quantity transversely or longitudinally of the deck to the auger or other mechanism for feeding the hay into the baling chamber.

Due to growth conditions and other factors, many hay crops, when cut, seldom fall and lie in even distribution over and along the field surface. More commonly the cut hay will lie ahead of the baler in quite uneven distribution both transversely and longitudinally of the baler path of movement whether the hay is lying as and where cut or in windrows into which it may have been raked or gathered in a preliminary operation preparatory to loading into a baler or other machine. It is not practical to spread or otherwise to eliminate the uneven condition of the cut hay prior to operation of a baler to bale it, but in the absence of some means whereby the hay may be fed in a relatively uniform flow sheet up the deck and into the auger and by the auger into the baling chamber, the difficulties above mentioned are almost certain to arise.

One of the principal objects of the invention, therefore, is to provide mechanism cooperative with hay pick-up and feed or conveyor mechanisms such as those mentioned above whereby masses of hay will be reduced and spread out to afford a substantially even or uniform flow from the pick-up onto and up the deck to the auger or comparable feed and whereby jams, breakdowns and other undesirable effects, heretofore encountered, may be avoided or minimized.

Many other objects will become apparent after reading the following description and claims and after viewing the accompanying drawings in which:

Fig. 2 is a view in vertical section taken substantially along the line 2—2 of Fig. 5 illustrating the relative positions that may be assumed by the rake and pick-up mechanisms at one stage in their operation;

Fig. 3 is a view corresponding to that of Fig. 2, illustrating the relative positions of the rake and pick-up mechanisms at another stage in their operation;

Fig. 4 is a view in section along the line 4—4 of Fig. 5;

Fig. 5 is a view from above looking vertically down upon the pick-up, rake and auger mechanisms and certain related parts of the machine shown in Fig. 1 some parts of the pick-up mechanism being broken away and some parts being shown in section;

Figure 1:
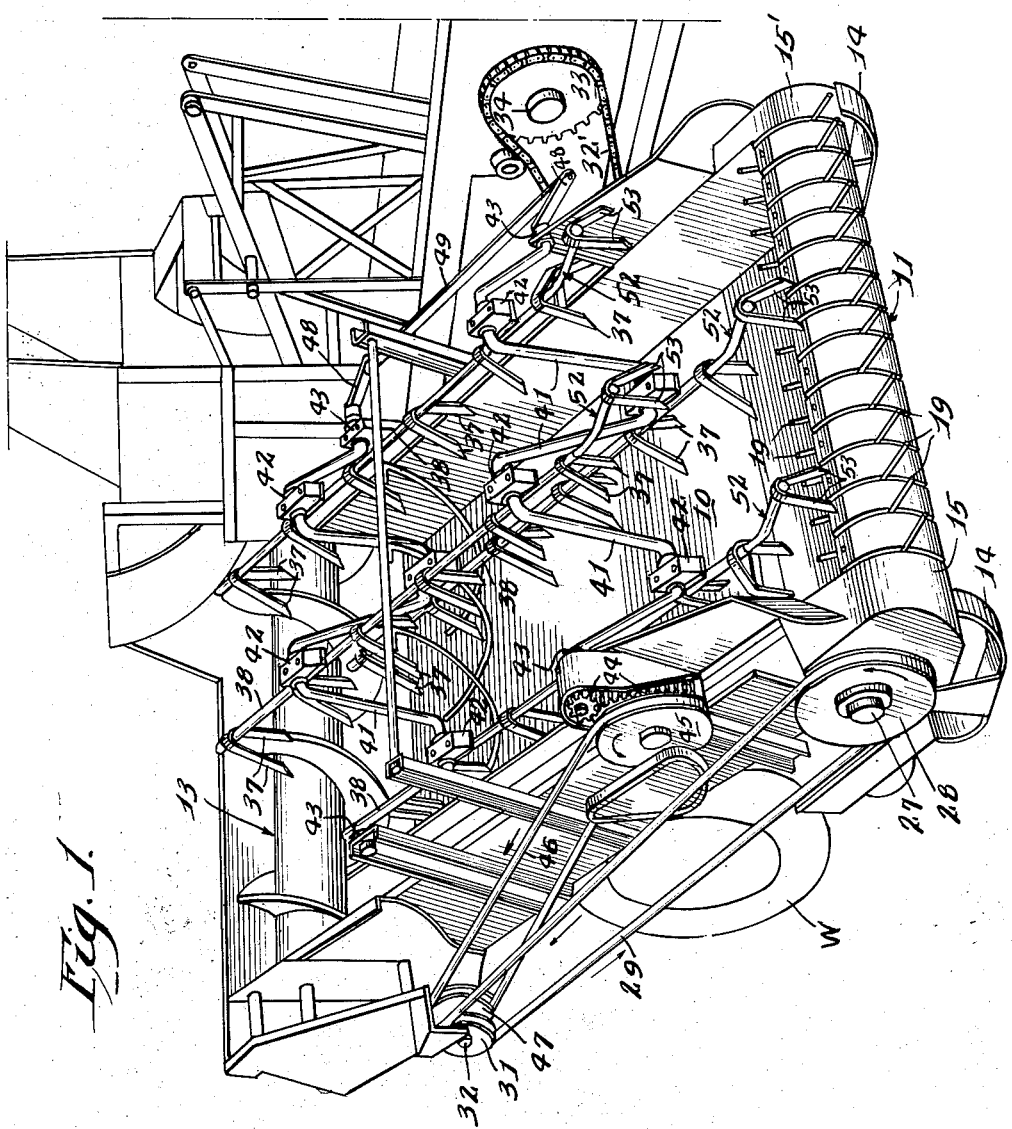
Fig. 1 is a perspective view of a hay baler of the type mentioned above, the view showing, principally, the pick-up, rake and auger conveyor parts of the machine.

Figs. 6 and 7, respectively, are side and bottom plan views of one form of special rake element employed in the mechanisms illustrated in the drawings; and Fig. 8 is a somewhat diagrammatic view in vertical section of the forward or lower end of the pick-up mechanism, for the purpose of illustrating relative movements and centers of movement of pick-up and rake mechanisms.

The hay baler with pick-up and conveying mechanism for feeding the hay to the baling mechanism is shown in Fig. 1 as it would appear viewed from the front by an observer standing somewhat ahead and to the right of the path along which the machine would progress in its operation. In other words the front of the pick-up and conveying mechanism is closest to the observer. Normally the baling machine, the baler proper and the pick-up and conveyor mechanism, as an entity, is drawn forward over the field by a tractor which may also furnish the power for operating some or all of the various mechanisms. However, it is deemed preferable to employ an independent power plant mounted directly upon the baler frame for operating the baler and the pick-up and feed mechanisms. The baler may be supported partly by a pair of wheels of which only one, designated W, is shown, and partly by the tractor which is connected to the baler by any well known draft or hitch mechanism, the tractor, of course, having its own wheel mounting.

Suitably supported upon the wheeled mounting of the baler is the feeder which, for convenience, will be considered as including an upwardly and rearwardly inclined floor or deck 10, a pick-up mechanism generally designated 11 at the forward or lower end of the deck, a rake mechanism generally designated 12 disposed and operating over the deck, and an auger generally designated 13 at the upper or rear end of the deck. At its forward end the feeder rests upon skid shoes or runners 14. As the machine is drawn forward, hay is picked up by the pick-up mechanism and deposited upon the deck 10 where it is engaged by the rake mechanism 12 and moved up to the auger 13 which then moves it transversely into the path of packer mechanism which packs it into the baling chamber where it is compressed into bales.

Suitably journaled at its ends within housing or support members 15, 15' is a shaft 16 upon and adjacent to each end of which a disk support 17 (one only shown) is secured for rotation with the shaft. Mounted by their ends between the disk supports 17 and in equal circumferential spacing from one another about and at equal radial distances from shaft 16 are three pick-up finger shafts 18 each of which carries a plurality of spring-wire pick-up fingers 19 in spaced relation to one another. Preferably the spring fingers 19 are formed as the opposite and radially outward projecting ends of spring coils 19' encircling the respective shafts 18 and secured against rotation and longitudinal displacement, bodily, relative to the shaft on which mounted although retaining their spring resilience, since only a center part of a coil is fastened to a shaft 18. The shafts 18 are so mounted in the disk supports 17 that they may oscillate about their own respective axes and each at its outer end where it passes through one of the disks 17 (the only disk 17 shown) carries a bell-crank lever 21 non-rotatably secured thereto. The outer end of each of levers 21 carries a cam track follower roll 22 adapted to engage with and to ride around in an endless cam track 23 which is fixedly secured within the housing or support member 15. As the cam follower rolls move around in the track 23, the pick-up fingers will be swung out at the bottom of their orbits and held in such position until they reach the top of their orbits when they will be swung in again.

The end 16' of shaft 16 which is shown at the upper left in Fig. 5 but which is at the right side of the machine relative to the normal direction of movement of that machine, may be equipped with a sprocket 24 whereby it may be rotated by a chain 25 trained over a sprocket 26 secured on a stub shaft 27 mounted in the side framing of the feeder. A V-pulley 28 secured on the outer end of stub shaft 27 is driven by a V-belt 29 which, in turn, is driven by a pulley 31 on a shaft 32 which may be connected through other power transmitting elements including chain drive 32', sprocket 33 and shaft 34, with a source of power.

As the feeder moves forward over the field on the surface of which the cut hay is lying, power is so applied to the shaft 16 as to cause it to rotate in a counter-clockwise direction, viewing the end 16' of that shaft in elevation as from the right side of the machine, so that the several shafts 18 carrying the pick-up fingers 19 will revolve in an orbit about the axis of shaft 16 and in a corresponding direction of movement, that is, counter-clockwise, as respects a view in elevation of shaft end 16', or, clockwise in the view of Fig. 4. Arrows adjacent to V-belt 29 and on pulley 28 in Fig. 1 and adjacent to shaft 16, disk 17 and fingers 19 in Fig. 4, indicate the direction of rotation or travel of these parts relative to the machine as a whole.

So moving and under the control of the cam track 23, each of the spring pick-up fingers is moved through a cycle which carries the finger downward toward and close to the field surface so that it may intercept and engage any hay in its path of movement, thence upward carrying with it any hay engaged, thence rearward over the deck or floor 10 when, through the action of gravity on the hay and the action of the cam track, the hay is discharged onto the deck, and thence downward to start a repetition of the cycle. The combined orbital movements of the several pick-up fingers and the forward movement of the machine as a whole, serve to gather the hay from the field and to deposit it upon the deck up which the hay is then moved by mechanism to be described hereinafter.

As will have been observed, the several pick-up fingers carried by each shaft 18 are so aligned with the corresponding pick-up fingers on the other two shafts that there are what may be termed "sets" of three pick-up fingers disposed in each of a plurality of parallel planes perpendicular to the axes of shafts 16 and 18 and spaced from one another at substantially regular intervals along those axes. Fig. 4 therefore may be considered as showing one "set" of pick-up fingers. Between adjacent sets of fingers 19 and with their edges spaced sufficiently from the fingers to avoid interfering with the movements of the fingers are trash guard bands 35 which, preferably extend completely about the pick-up mechanism. Each band 35 is held in position by a stripper plate 36 which at one end is secured to the band and at its other end is secured to the deck or floor 10. From the band 35 to a place adjacent to the deck 10 each stripper plate is substantially tangent to its band and substantially parallel to the earth surface but then curves convexly to tangency with the upwardly sloping surface of the deck.

Each pick-up finger as it reaches a point at the zenith of its upward travel is swung rearward and about the shaft 18 upon which it is mounted through the operation of the cam track and follower engaged therewith, these same mechanisms causing the finger to swing toward the slot formed between adjacent trash guard bands and, normally, tensioning the spring coils. This operation and the rotation of shafts 18 about the shaft 16 will cause the spring fingers to recede downward through the slots between the stripper plates 36 so that any hay not already released from the pick-up fingers will be stripped therefrom.

Hay fed up to the deck by the pick-up mechanism must be moved up the deck to the auger 13 by which, in the illustrated embodiment, it is to be fed to the baler proper. To this end a mechanically actuated raking mechanism operates over the width and length of the inclined deck 10. In its ordinary and well known form this rake mechanism may comprise a plurality of rake members 37 each of U-shape to provide a pair of spaced teeth, mounted in spaced relation to one another along the lengths of spaced rake bars 38 each of which is carried by a pair of crank shafts 39 on crank arms 41 which, as between adjacent rake bars 38, are displaced 180° from one another. Bearing blocks 42 of wood or other suitable material support the rake bars 38 on the crank arms 41 and similar bearing blocks 43 support the ends of crank shafts 39. The lower crank shaft 39 is rotated through a pair of gears 44, pulley 45, V-belt 46 and pulley 47 on power transmitting shaft 32 while the upper crank shaft 39 is rotated through connection with the lower crank shaft 39 by means of crank arms 48 and connecting rod 49. The arrows in Fig. 1 indicate the direction (clockwise) in which the two crank shafts are to turn.

The turning crank shafts impart such motion to the rake bars and rake members that every point or any point on each will describe a circle (in space), the point moving in a counterclockwise direction viewing Figs. 2 and 3. This motion carries the rake members 37 forward (in the direction of movement of the machine as a whole as indicated by the arrows in Figs. 2 and 3) and downward toward the deck 10 to engage hay fed upwardly and rearwardly by the pick-up fingers 19, continued motion of the rake members 37 moving the hay and increment up the deck 10 before the rake members are withdrawn upwardly from the hay for return through the cycle to engagement with a succeeding batch of hay adjacent to the lower end of the deck. Each succeeding rake member engages with hay which has been fed toward it by the preceding rake member in a previous cycle so that the hay gathered by the pick-up mechanism will be carried up the deck to the auger 13 which, continuously rotating in a direction indicated by the arrows in Figs. 2 and 3 by virtue of power applied from one of the sources mentioned through a sprocket and chain connection, generally designated 60, with the auger shaft 13', feeds the hay transversely of the deck 10 along a trough 51 to the baling mechanism.

If the hay as cut and lying over the field area were even in depth and density, so that it would have even flow across the entire width and along the entire length of the path to be covered by the several gathering mechanisms above described, that is, across the entire width of the deck 10 or from end to end of the pick-up mechanism 11, little difficulty might be encountered in gathering and feeding it. However, it may be said that it rarely happens that such ideal conditions exist over any substantial field area. On the contrary it is far more usual to find the hay in unequal and uneven distribution both across and along the gathering path and when such conditions exist clogging and damage including breakage of the gathering mechanisms are almost inevitable. Even if the hay or other material being gathered did not pile up or clog the machine along the deck and between the rake members and the pick-up mechanism, a single large mass reaching the auger 13 may cause a jam in such cross feed mechanism or in the baler as will be appreciated. The efficiency and effectiveness of machines such as that of the prior art so far described herein, is very much improved and the difficulties heretofore encountered and indicated above are practically eliminated by the addition of the improvements of the invention hereof, now to be more specifically described.

In accordance with a preferred form of my invention I provide an extension bar generally designated 52 to be attached to the forward end of each of the rake bars 38 by one end and at the other end carrying a U-shaped rake member 53. Since the rake bars 38 may be formed from hollow tubing, the extension bars may also be made from hollow tubing with a solid dowel rod 54 secured in the end of the bar which is to be connected with a rake bar 38, the dowel 54 detachably fitting within the tubular end of rake bar 38 and held against accidental displacement therefrom by any suitable means such as a bolt passing through the rake bar 38 and the dowel rod 54, a hole 55 for this purpose as shown in the dowel rod 54 in Fig. 7.

Preferably each extension or auxiliary rake bar 52 and its rake member 53 will be so disposed and dimensioned as to locate (see Fig. 8) the center C of the circle P, described by either pointed end of rake member 53, above and forward of the axis of the pick-up mechanism shaft 16 and at such distance from the circular trash guard 35 as to permit the pointed ends of the rake member 53 to clear the guard. In a very satisfactorily operating working embodiment of the improved machine herein described wherein the radial distance from the axis of the shaft 16 to the outer surface of a circular trash guard 35 was 4½ inches and the circle P described by a point of the rake member 53 was approximately 14 inches in diameter, the center C of the circle P was so set or located that a line dropped therefrom and normal to the ground or horizontal would intersect a horizontal line through the axis of shaft 16 at a point approximately ½ inch outwardly away from the outer surface of the circular trash guard 35 or at a radial distance of approximately 5 inches from the axis of the shaft 16. This provides between ¼ and ½ inch clearance between the ends of the rake members 53 and the respective trash guard surfaces over which they pass. The arrangement in the embodiment here mentioned, placed the closest approach of the orbit of each pointed tooth of each auxiliary rake member 53 to the respectively adjacent trash guard at a place in advance or forward of a perpendicular from the ground through the axis of the pick-up shaft 16, as will be apparent in the illustration of Fig. 8 which fairly represents the arrangement.

Of course the diameter of circle P depends upon the throw of the crank arm upon which is mounted the rake bar to which the particular auxiliary rake bar is connected and, in the instance given above, that throw was approximately 14 inches. It is desirable that the blades or tines of the auxiliary rakes extend, in side view aspect as in Figs. 2 and 3, substantially normal to the ground or horizontal and also fairly close to normal to the plane in which lie the major portions of stripper plates 36. This disposition of the auxiliary rake member blades or tines in the instant embodiment has been attained by bending each auxiliary bar at two places, one place being at the junction between the tube part and the dowel part and the other place being spaced slightly from the rake members 53, thereby so setting such rake blades or tines that they extend, lengthwise, at an angle of approximately 45° to the blades or tines of rake members 37.

The auxiliary raking mechanism engages hay brought up by the pick-up fingers and while it helps to move it toward the deck and within reach of the normal or usual rake members 37, its primary effect is to break up or tear apart unduly large bundles or clumps of hay to distribute and feed the same in a relatively even stream of more nearly constant thickness and density both longitudinally and transversely of the stream flow. The last mentioned effect is secured partly by reason of a higher rate of rotation for the crank shafts carrying the rake bars and rake members than for the pick-up shaft 16 and partly by virtue of a somewhat higher peripheral rate of travel of the outer ends of the rake members 53 than the peripheral rate of travel of the outer ends of pick-up fingers 19 since it is preferred that the radius of circle C be somewhat greater than the radial distance from the axis of shaft 16 to the outermost reach of the outer ends of pick-up fingers 19. Either could be sufficient to set up a differential action between the pick-up fingers 19 and the auxiliary rake members 53 with the result that bundles of hay caught between those fingers and members will be pulled or torn apart as well as fed toward the deck. However, it may not always be necessary to have a differential peripheral speed of travel between the outer ends of pick-up fingers 19 and the outer ends of the rake members 53 as, for instance, where the hay to be gathered may not need to be pulled or torn apart but merely fed in a positive manner toward the deck.

Experience with a baling machine feed mechanism, such as described, equipped with the auxiliary raking mechanism illustrated, has demonstrated an efficiency such that, for example, when baling heavy and coarse marsh hay, from 10 to 15 more bales per hour can be baled than when using the same baling machine to bale the same material but without employing the auxiliary raking mechanism. Where coarse and certain other types of hay are being handled it may be helpful to employ curved guide bars such as those designated 50 which at their upper ends may be secured to transverse framing 40 and at their lower ends are spaced above the deck.

Heretofore also, it has been found, when the hay being gathered by pick-up mechanisms of the character described was light and fluffy it would tend to accumulate and roll or be pushed ahead of the advancing machine and would not feed upward and backward to the deck properly if at all. Sometimes such "balling" hay will slide or work to one side or the other of the machine either being by-passed by the machine or feeding to the deck or other conveyor in masses instead of evenly. Utilization of the invention eliminates such difficulties since the rake members 53 "reach forward" and draw the loose or light and fluffy hay backward preventing it from accumulating in large mass or bulk ahead of the pick-up and from escaping to the sides thereof and cooperate with the fingers 19 constantly to move the hay in a relatively even stream flow toward the deck and to within the "reach" of rake members 37. Experiments with such kinds of hay have shown that a baler equipped with the invention will bale from fifteen to twenty-five more bales per hour than when not so equipped.

It will be appreciated that the invention may be embodied in other types of crop harvesting or gathering machines and may be modified and varied in many respects without departure from the invention spirit and the scope of the appended claims.

I claim:

1. A mobile hay gathering device comprising a frame carrying an upwardly and rearwardly inclined deck, a rotatable tined pick-up mechanism adjacent to the lower end of the deck and having portions extending generally above the plane of the deck at its lower end, stripper plate means in cooperative relation with said pick-up mechanism and forming a forward continuation of the deck, an orbitally movable raking means including a plurality of downwardly directed hay engaging elements spaced from one another longitudinally and transversely of the deck and having their centers of orbital movement spaced substantially uniformly from the deck, said raking means also including a plurality of downwardly extending auxiliary hay engaging elements located forward of the first said elements and movable in orbital paths about centers so located above the pick-up mechanism that portions of their orbital paths extend forward of and other portions immediately above the pick-up mechanism.

2. A mobile hay gathering device as defined in claim 1 in which the stripper plate means makes an angle of greater than 90° with the upper side of the deck at its juncture therewith, the first said raking elements are relatively rigid tines extending substantially normal to the plane of the deck, and the auxiliary elements are relatively rigid tines extending substantially normal to the stripper plate means.

3. A mobile hay gathering device comprising a frame carrying an upwardly and rearwardly inclined deck, a rotatable tined pick-up mechanism adjacent to the lower end of the deck and having portions extending generally above the plane of the deck at the lower end of the deck, stripper plate means in cooperative relation with said portions and tines of the pick-up mechanism and forming a forward continuation of the deck, an orbitally movable raking means above the deck, said raking means including a plurality of hay engaging elements extending toward said deck for orbital movements thereover about centers in a substantially common plane generally parallel to the deck, said raking means also including a plurality of auxiliary hay engaging elements movable above the pick-up mechanism in orbits about centers located above the said common plane of centers of orbital movement of the first said elements.

4. A mobile hay gathering device as defined in claim 3 in which the first said elements are tines extending substantially normal to the deck and the auxiliary elements are tines directed downward toward the pick-up mechanism and are disposed at an acute angle to the first said elements.

References Cited in the file of this patent

UNITED STATES PATENTS

| | | |
|---|---|---|
| 828,552 | Johnston | Aug. 14, 1906 |
| 978,725 | Foster et al. | Dec. 13, 1910 |
| 1,478,556 | Dain | Dec. 25, 1923 |
| 2,499,615 | Tuft | Mar. 7, 1950 |
| 2,572,180 | Morrison | Oct. 23, 1951 |

FOREIGN PATENTS

| | | |
|---|---|---|
| 241,472 | Great Britain | Oct. 22, 1925 |